United States Patent
Wang

(10) Patent No.: US 6,522,820 B2
(45) Date of Patent: Feb. 18, 2003

(54) METHOD OF FABRICATING MICROSTRUCTURED OPTICAL FIBERS

(75) Inventor: Shih-Yuan Wang, Palo Alto, CA (US)

(73) Assignee: Gazillion Bits, Inc., San Jose, CA (US)

( * ) Notice: Subject to any disclaimer, the term of this patent is extended or adjusted under 35 U.S.C. 154(b) by 0 days.

(21) Appl. No.: 09/781,343

(22) Filed: Feb. 12, 2001

(65) Prior Publication Data

US 2002/0031319 A1 Mar. 14, 2002

Related U.S. Application Data

(63) Continuation-in-part of application No. 09/591,474, filed on Jun. 9, 2000.

(51) Int. Cl.[7] .................................................. G02B 6/02
(52) U.S. Cl. ........................ 385/125; 385/123; 385/124; 385/141; 65/385
(58) Field of Search ................................. 385/125, 123, 385/124, 141; 65/385

(56) References Cited

U.S. PATENT DOCUMENTS

| | | |
|---|---|---|
| 5,155,792 A | 10/1992 | Vali et al. |
| 5,907,652 A | 5/1999 | DiGiovanni et al. |

OTHER PUBLICATIONS

Plummer, *Silicon VLSI Technology: Fundamentals, Practice and Modeling*, Prentice Hall (2000), Cover page and table of contents.

Plummer, *Silicon VLSI Technology: Fundamentals, Practice and Modeling*, Prentice Hall (2000), Cover page and table of contents.

Russell, Knight, Birks, Mangan, and Wadsworth, Recent Progress in Photonic Crystal Fibres, ThG1–1—ThG–3, 980100, Optical Fiber Communication Conference 2000, Technical Digest Series, Conference Edition, Baltimore, Maryland, Mar. 7–10, 2000 (Optical Society of America).

Monro, Bennett, Broderick, and Richardson, "New Possibilities with Holey Fibers," ThG4–1—ThG4–3, 106–108 Optical Fiber Communication Conference, 2000, Technical Digest Series, Conference Edition, Baltimore, Maryland, Mar. 7–10, 2000 (Optical Society of America).

Windeler and Ranka, "Novel Properties of Air–Silica Microstructure Optical Fibers," ThG3–1—ThG3–2, 104–105 Optical Fiber Communication Conference, 2000, Technical Digest Series, Conference Edition, Baltimore, Maryland, Mar. 7–10, 2000 (Optical Society of America).

(List continued on next page.)

*Primary Examiner*—Robert H. Kim
*Assistant Examiner*—George Wang
(74) *Attorney, Agent, or Firm*—Cooper & Dunham LLP

(57) ABSTRACT

A method of fabricating a microstructured optical fiber is described in which a plurality of solid silica wafers are generated corresponding to longitudinally consecutive portions of the optical fiber, separately etched with void patterns in a lithographic process, and bonded together into a preform. The preform is then drawn to form the optical fiber. The lithographic process used to form the void patterns in the wafers may be any of several processes currently or prospectively used in VLSI fabrication. Such lithographic process may be used because the wafers comprise silica glass or other material common in VLSI devices and, in accordance with a preferred embodiment, are generated with thicknesses highly amenable to such fabrication methods. The wafers are preferably generated by creating a preliminary preform having the desired material refractive index profile using conventional preform fabrication methods, the wafers then being sliced from the preliminary preform. Other methods such as flame hydrolysis process or a chemical vapor deposition process may also be used to generate the wafers.

20 Claims, 3 Drawing Sheets

OTHER PUBLICATIONS

Broeng, Barkou, and Bjarkley, "Polarization Properties of Photonic Bandgap Fibers," ThG2–1—ThG2–3, 101–103 Optical Fiber Communication Conference, 2000, Technical Digest Series, Conference Edition, Baltimore, Maryland, Mar. 7–10, 2000 (Optical Society of America).

Dutton, *Understanding Optical Communications* (Prentice–Hall 1998), Contents and pp. 42–45.

Hecht, *Understanding Fiber Optics*, 3rd ed. (Prentice–Hall 1999), Contents and pp. 68–73.

Keiser, *Optical Fiber Communications*, 3rd ed. (McGraw–Hill 2000), Contents and pp. 70–75.

http://www.blazephotonics.com/pages/techn.htm—dated Mar. 30, 2001.

http://www.blazephotonics.com/pages/press.htm—dated Mar. 30, 2001.

U.S. application Ser. No. 09/781,344, filed Feb. 12, 2001.
U.S. application Ser. No. 09/781,352, filed Feb. 12, 2001.
U.S. application Ser. No. 09/781,341, filed Feb. 12, 2001.

Wu, B., and Chu, P., "Fabrication of High Concentration Rare–Earth–Doped Silica–Based Waveguide by MCVD Method," IEEE Photonics Technology Letters, vol. 7, No. 6 (Jun. 1995), pp. 655–657.

Kilian, A. et al., "Birefringence Free Planar Optical Waveguide Made by Flame Hydrolysis Deposition (FHD) Through Tailoring of the Overcladding," Journal of Lightwave Technology, vol. 18, No. 2 (Feb. 2000), pp. 193–198.

Suzuki, S., et al., "Integrated–Optic Ring Resonators with Two Stacked Layers of Silica Waveguide on Si," IEEE Photonics Technology Letters, vol. 4, No. 11 (Nov. 1992), pp. 13256–1258.

Cheng, Y. et al., "Localized Silicon Fusion and Eutectic Bonding for MEMS Fabrication and Packaging," IEEE Journal of Microelectromechanical Systems, vol. 9, No. 1 (Mar. 2000), pp. 1–8.

Maszara, W. et al., "Bonding of Silicon Wafers for Silicon–on–Insulator," Journal of Applied Physics 64 (10) Nov. 15, 1998), pp. 4943–4950.

METHOD OF FABRICATING MICROSTRUCTURED OPTICAL FIBERS

CROSS-REFERENCE TO RELATED APPLICATIONS

This application is a continuation-in-part of commonly assigned U.S. patent application Ser. No. 09/591,474, filed Jun. 9, 2000. This application is related to the subject matter of commonly assigned copending patent application Ser. Nos. 09/781,344, 09/781,352, and 09/781,341, each filed on the filing date of the present application. Each of the above disclosures is incorporated by reference herein.

FIELD

This patent specification relates to the field of optical fibers. More particularly, it relates to a method of fabricating a microstructured optical fiber.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high speeds over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across substantial distances.

A conventional optical fiber is essentially an optical waveguide having an inner core and an outer cladding, the cladding having a lower index of refraction than the core. Because of the difference in refractive indices, the optical fiber is capable of confining light that is axially introduced into the core and transmitting that light over a substantial distance. Because they are able to guide light due to total internal reflection principles, conventional optical fibers are sometimes referred to as index-guiding fibers. Conventional optical fibers have a solid cross-section and are made of fused silica, with the core region and the cladding region having different levels of dopants (introduced impurities) to result in the different indices of refraction. The cladding is usually doped to have a refractive index that ranges from 0.1% (single mode fibers) to 2% (multi-mode fibers) less than the refractive index of the core, which itself usually has a nominal refractive index of 1.47.

Conventional optical fiber fabrication techniques generally involve the formation of a cylindrical preform having the desired refractive index profile. The preform is then heated and drawn into a thin fiber. See Hecht, *Understanding Fiber Optics,* Prentice-Hall (1999), which is incorporated by reference herein, at pp. 108–115; see also Keiser, *Optical Fiber Communication,* 2nd Ed., McGraw Hill (1991), which is incorporated by reference herein, at pp. 63–68. The preform is commonly fabricated by the longitudinally concentric formation of a fluffy fused-silica soot generated by reacting $SiCl_4$ (along with $GeCl_4$ when used as a dopant) with oxygen to generate $SiO_2$, i.e. silica (along with $GeO_2$ if the silica is doped). Many approaches have been developed for accomplishing and controlling the soot formation, including inside vapor deposition, outside vapor deposition, and vapor axial deposition. The desired refractive index profile is achieved through control of the chemicals used during the soot formation process. Heating melts the soot, which then condenses into a glass. The preform, which is commonly about 10 cm in diameter, is then mounted vertically in a large drawing tower, heated at the bottom, and drawn out into a thin fiber of about 100 $\mu$m–130 $\mu$m in diameter. In the 100 $\mu$m case, the drawing process thus reduces the diameter of the preform by a factor of 1000. Accordingly, the final optical fiber is $1000^2=1$ million ($10^6$) times longer than the preform, with each micrometer of preform turning into one meter of optical fiber.

Special difficulties arise, however, in the fabrication of microstructured optical fibers disclosed, for example, in copending Ser. Nos. 09/591,474, 09/781,344, and 09/781,352 due to the nature of the void patterns therein. FIG. 1 illustrates an example of a microstructured optical fiber 100 disclosed in copending Ser. No. 09/781,352 in which 50.0% of the cladding cross-sectional area is occupied by voids and 50.1% of the core cross-sectional area is occupied by voids. Optical fiber 100 comprises a core region 102 made of a core material 106 and a cladding region 104 made of a cladding material 110, core material 106 having an index of refraction $n_1$ higher than an index of refraction $n_2$ of the cladding material 110, the effective index of refraction of the core region 102 being slightly higher than the effective index of refraction of the cladding region 104. Preferably, void sizes are substantially less than the wavelength of light being propagated, e.g. less than 10% of the wavelength. Identical first patterns of circular voids 108 and 112 are formed in the core and cladding materials, respectively, having an exemplary diameter of 100 nm and an average center to center spacing of 125 nm. A second pattern of smaller voids 109 is also formed in the core region, e.g., one small void for each larger void, each small void having a diameter of 4.5 nm. Although some preferred embodiments of the microstructured optical fiber use core and cladding materials having the same index of refraction, the optical fiber 100 in FIG. 1 represents a general case in which there is different doping in the core and cladding.

Proposals have been made for fabricating optical fibers having voids in their cross-sections, one such proposal being disclosed in U.S. Pat. No. 5,802,236 ("the '236 patent"), which is incorporated by reference herein. The method discussed in the '236 patent generates a preform by bundling hollow silica capillary tubes around a center silica glass rod, being sure to physically arrange them in a scaled version of the ultimate desired pattern. One or more silica overcladding tubes is then placed around the entire bundle and melted around it to produce the desired preform. The preform is then drawn using conventional techniques to generate the optical fiber.

Importantly, however, the mechanical bundling process of the '236 patent and similar methods are not readily scalable to the number and precision of voids in the index-guiding microstructured optical fiber 100 of FIG. 1. For example, it is readily calculated that, for an exemplary core diameter of 25 $\mu$m and an exemplary cladding diameter of 100 $\mu$m, there are about 500,000 of the larger 100 nm holes and about 31,250 of the smaller holes in the optical fiber of FIG. 1. In general, prior art processes such as those of the '236 patent that are designed to form tens, or perhaps hundreds, of voids in the optical fiber are not well-suited for fabricating the index-guiding microstructured optical fiber 100 of FIG. 1, in which up to several hundred thousand or more voids are required.

Accordingly, it would be desirable to provide a method for fabricating a microstructured optical fiber having a large number of longitudinal voids formed therein.

It would be further desirable to provide a method for fabricating a microstructured optical fiber in which the voids can be formed in any of a variety of shapes and patterns.

It would be still further desirable to provide a method for fabricating a microstructured optical fiber in which the voids can be designed in complex patterns, including even arbitrarily complex patterns, yet fabricated to a high degree of precision.

SUMMARY

In accordance with a preferred embodiment, a method of fabricating a microstructured optical fiber is provided in which a plurality of solid wafers are generated corresponding to longitudinally consecutive portions of the optical fiber, separately etched with void patterns in a lithographic process, and bonded together into a preform. The preform is then drawn to form the optical fiber. The lithographic process used to form the void patterns in the wafers may be any of several processes currently or prospectively used in very large scale integrated circuit (VLSI) fabrication. Such lithographic process may be used because the wafers comprise silica glass or other material common in VLSI devices and, in accordance with a preferred embodiment, are generated with nominal thicknesses highly amenable to such fabrication methods.

Any of several methods may be used to initially generate the solid wafers in accordance with a preferred embodiment. In one preferred embodiment, a preliminary preform having the desired material refractive index profile is generated using conventional preform fabrication methods. The wafers are then mechanically sliced from the preliminary preform.

In another preferred embodiment, the wafers are formed by a flame hydrolysis process similar to processes used in planar waveguide technology, which may be controlled to yield the desired refractive index profile for each wafer. In another preferred embodiment, the wafers are grown by forming a layer of $SiO_2$ using a chemical vapor deposition process or similar semiconductor fabrication process known to grow $SiO_2$. In still another preferred embodiment, the wafers may be formed by oxidizing silicon (Si) to form a layer of $SiO_2$ thereon, in a process similar to a known semiconductor fabrication processes. The refractive index profile of each wafer may be initially achieved and/or modified by a hybrid chemical/lithographic process.

The wafer bonding process is similar to $SiO_2$—$SiO_2$ bonding processes known in the semiconductor fabrication field. Depending on which of the above methods is used to generate the wafers, each wafer lies on its own silicon substrate, or if no such substrate is present, one is attached. A first and second wafer are bonded together, and the silicon substrate remaining on top of the two-element stack is removed. A third wafer is bonded to the two-element stack, and the silicon substrate remaining on top of the three-element stack is removed, and so on. After all wafers have been added, the bonded stack constitutes the desired preform.

Advantageously, highly sophisticated lithographic techniques for forming complex patterns in silica ($SiO_2$) are known in the field of VLSI technology. Because such lithographic techniques can used to form the void patterns and/or spatially dope the wafers, the resulting optical fiber can have a cross-section of highly complex patterns and yet be fabricated to a high degree of precision.

DETAILED DESCRIPTION

Figure 1:
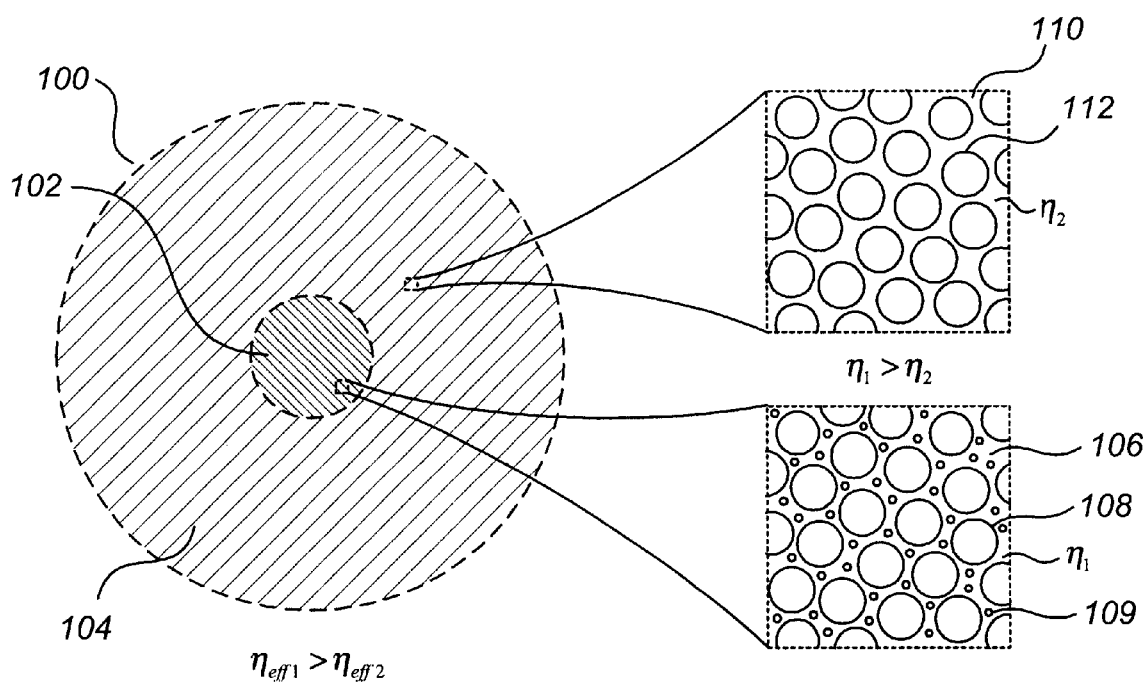
FIG. 1 illustrates a microstructured optical fiber fabricated in accordance with the preferred embodiments.
Figure 2A:
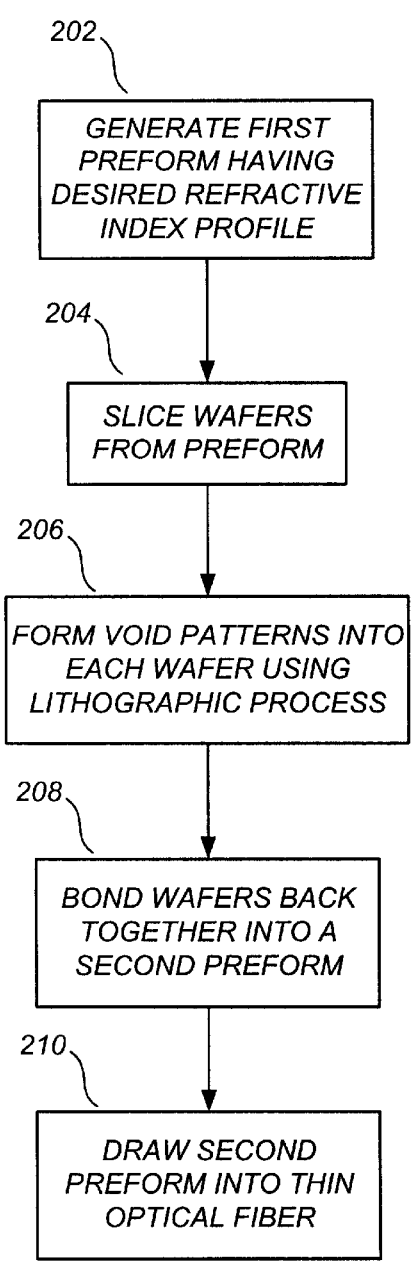
FIGS. 2A and 2B illustrate steps for fabricating a microstructured optical fiber, and conceptual diagrams corresponding thereto, in accordance with a preferred embodiment.
Figure 2B:
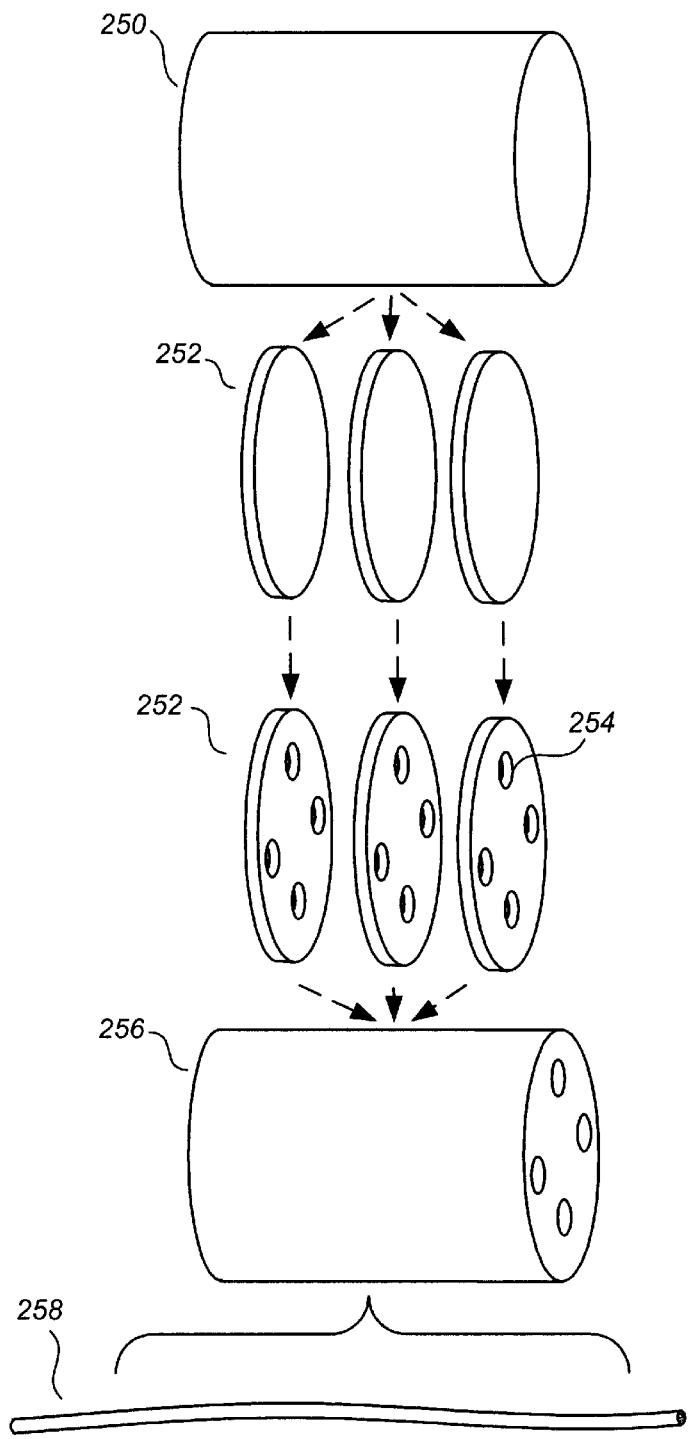

FIG. 2A illustrates steps for fabricating a microstructured optical fiber in accordance with a preferred embodiment. FIG. 2B illustrates conceptual diagrams corresponding to the steps of FIG. 2A, the conceptual diagrams being simplified for clarity of disclosure and showing four large voids in lieu of the much greater number of optical fiber voids according to the preferred embodiments. At step 202, a preliminary preform 250 is created having the desired refractive index profile using methods known in the art and described, for example, in Keiser, *Optical Fiber Communications,* 2nd ed., McGraw-Hill (1991), which is incorporated by reference herein, at pp. 63–68.

At step 204, the wafers 252 are sliced from the preliminary preform 250. At step 206, void patterns 254 are lithographically formed into the wafers 252. A lithographic process generally includes techniques involving the computer-aided design of a pattern to be formed into an object material, the application of an etch-resistant material (e.g., photoresist) to the object material, the application of the pattern onto the etch-resistive material such that selected portions of the etch-resistant material remain while other portions are removed, and then application of an etchant such that object material not covered by the etch-resistant material is removed. A lithographic process may include other processes as well. See generally Plummer, *Silicon VLSI Technology: Fundamentals, Practice and Modeling,* Prentice Hall (2000), which is incorporated by reference herein.

According to a preferred embodiment, a nominal thickness of the wafers 252 is selected (i) to be thin enough such that lithographic techniques may used to form voids having substantially uniform dimensions throughout the thickness of the wafer, while (ii) being thick enough for effective manipulation, and thick enough to result in a conveniently long section of optical fiber when drawn. One key factor in selecting a nominal wafer thickness is an aspect ratio of the lithographic process with respect to the wafer material, corresponding to a ratio of the depth that a given void feature may be etched into the wafer divided by a linear dimension of the void feature. Another key factor is a pull factor by which the wafer will be axially stretched during the drawing process, which will usually be on the order of magnitude of 1,000,000 as described supra.

According to one preferred embodiment, the nominal wafer thickness is selected to be about 0.5 mm. Where a typical void size of about 100 nm is desired in the resulting optical fiber, the preform would require a void size of about 100 μm, because the drawing process reduces the linear size of a void dimension by a typical factor of about 1000. Lithographic techniques continue to improve, and are currently known to achieve aspect ratios as high as 100 into silica material. The selection of a 0.5 mm nominal thickness versus a wafer void size of 100 μm would correspond to an aspect ratio of only about 5.0, and therefore highly precise and consistent void patterns can be created through the entire thickness of the wafer. At the same time, a 0.5 mm nominal thickness corresponds to a resulting portion of fiber that is about (1,000,000)(0.5 mm) or about 0.5 km of optical fiber after drawing. Thus, only about 2 wafers are needed per km of optical fiber.

Nominal wafer thicknesses less than 0.5 mm may also be selected in accordance with the preferred embodiments, for achieving even better void pattern consistency, although more wafers per km of optical fiber would be required. For example, where very small void patterns of 4.5 nm in the optical fiber (4.5 $\mu$m in the wafer) are desired, as in an example given supra in the present disclosure, a nominal wafer thickness closer to 0.1 mm would be desirable such that the required minimum aspect ratio of the lithographic process would be about 22.2.

Nominal wafer thicknesses greater than 0.5 mm may also be selected, wherein fewer wafers would be required per km of optical fiber. However, wafer thickness should generally not exceed the product of the aspect ratio of the lithographic process times the linear dimension of the smallest void used. Thus, for example, where the smallest void size in the optical fiber is 100 nm (100 $\mu$m in the wafer), the wafer thickness should generally be no greater than 100*100 $\mu$m=1 cm. In the event that 1 cm wafers were used, each wafer would correspond to (1,000,000)(1 cm)=10 km of optical fiber. Preferably, a dry etch is preferred at step 206 to a wet etch, as the dry etch is more anisotropic (i.e., more directional) and the void dimensions will be more precise through the thickness of the wafer.

At step 208, the wafers 252 are bonded together into a preform 256, as will be described further infra with respect to FIGS. 3A and 3B. Finally, at step 210, the preform 256 is drawn using a conventional optical fiber drawing process into the desired optical fiber 258.

Alternatively to steps 202 and 204 of FIG. 2, wafers having the desired thicknesses and refractive index profiles may be generated using other methods. In one preferred embodiment, a wafer is grown by forming a layer of silicon dioxide using a chemical vapor deposition (CVD) process or any semiconductor fabrication process known to grow silicon dioxide. Examples include plasma-enhanced chemical vapor deposition (PECVD), thermal oxidation, ion implantation, sputter deposition, and thermal deposition. One applicable CVD process is described in Wu, B., and Chu, P., "Fabrication of High Concentration Rare-Earth-Doped Silica-Based Waveguide by MCVD Method," IEEE Photonics Technology Letters, Vol. 7, No. 6 (June 1995), pp. 655–657, which is incorporated by reference herein. The refractive index profile of the wafer may be achieved by a hybrid chemical/lithographic process. In this process, the core portion of the wafer may be doped by masking off the cladding portion and exposing the core portion at high temperatures to a germanium-based or fluorine-based chemical dopant. The lithographic mask is analogous to photoresist in that it prevents the underlying cladding material from being doped along with the core material. The mask is then removed, and a process is repeated for the cladding portion.

In another preferred embodiment, a wafer may be formed by a flame hydrolysis process similar to processes used in planar waveguide technology. Examples of applicable flame hydrolysis processes are described in Kilian, A. et. al., "Birefringence Free Planar Optical Waveguide Made by Flame Hydrolysis Deposition (FHD) Through Tailoring of the Overcladding," Journal of Lightwave Technology, Vol. 18, No. 2 (February 2000), pp. 193–198, and Suzuki, S., et. al., "Integrated-Optic Ring Resonators with Two Stacked Layers of Silica Waveguide on Si," IEEE Photonics Technology Letters, Vol. 4, No. 11 (November 1992), pp. 1256–1258, which are incorporated by reference herein. The desired refractive index profile may also be achieved during the flame hydrolysis process. During this process, a soot having the appropriate core doping is formed on the entire wafer. The wafer is sintered to convert the soot in the core to a doped silica glass. The core portion is masked, and cladding portion is etched away. Another soot layer having appropriate cladding doping is deposited across the entire wafer. The wafer is again sintered, whereby the cladding region has a single silica glass layer and the core region has two silica glass layers. The wafer is then planarized using a chemical-mechanical process to remove the second silica glass layer from the first layer, the resulting wafer having the desired refractive index profile.

Figure 3A:
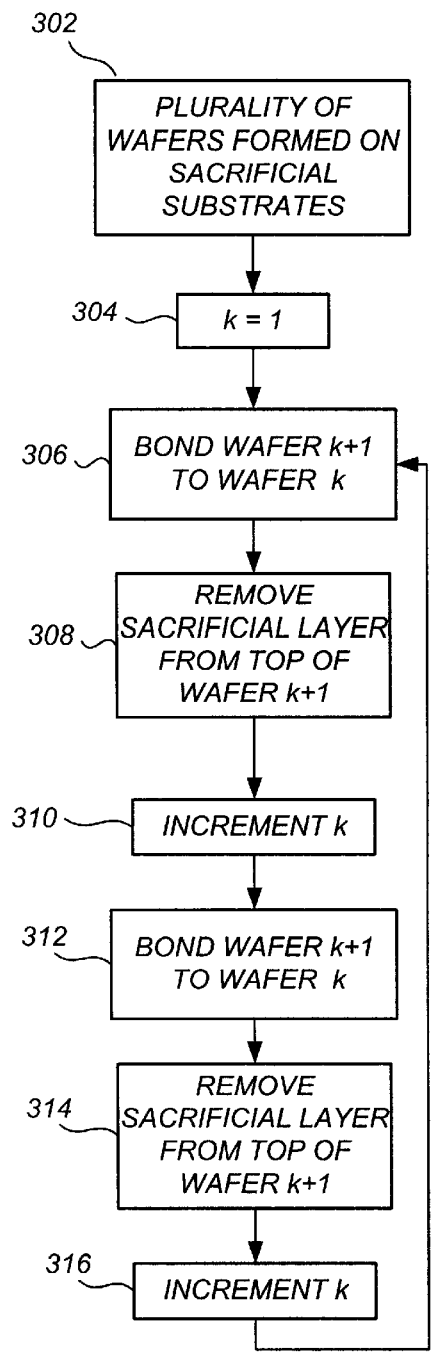
FIGS. 3A and 3B illustrate steps for bonding wafers into a microstructured optical fiber preform, and conceptual diagrams corresponding thereto, in accordance with a preferred embodiment.
Figure 3B:
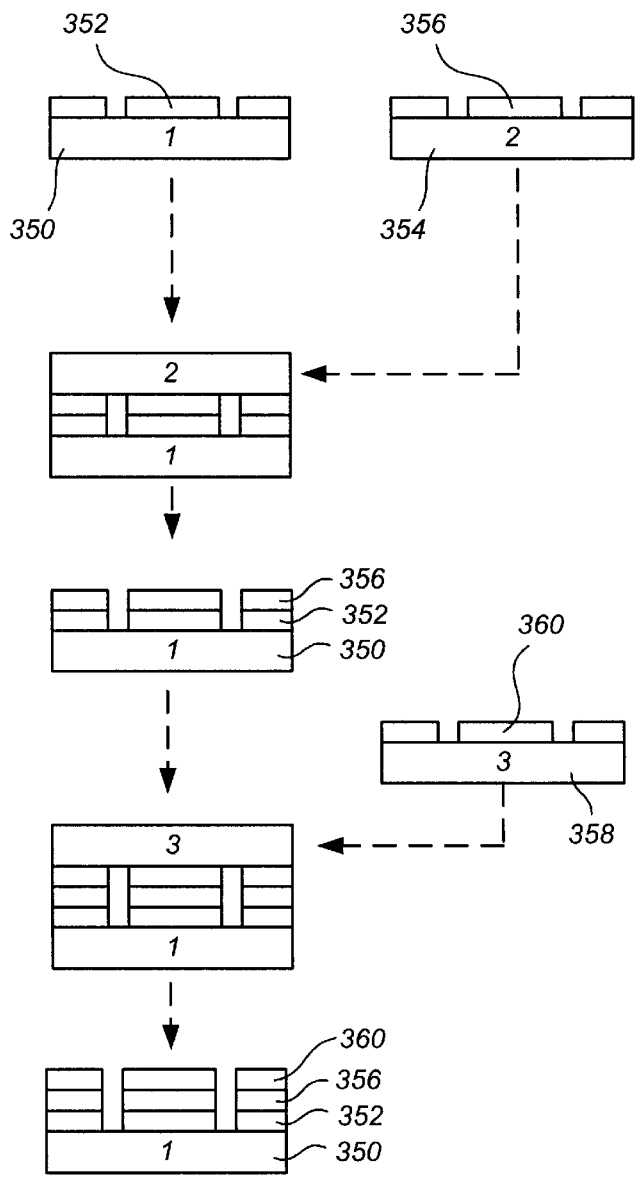

FIG. 3A illustrates steps corresponding to step 208 of FIG. 2 for bonding the wafers together into a preform in accordance with the preferred embodiments, the steps being diagrammatically illustrated in FIG. 3B in a simplified two dimensional representation. At step 302, depending on which method was used to generate the wafers, each wafer lies on its own silicon substrate, or if no such substrate is present, one is attached. FIG. 3B illustrates two such assemblies, a first wafer 352 lying on a substrate 350, and a second wafer 356 lying on a substrate 354. A variable k used for describing the steps of FIG. 3A is initialized at step 304. At step 306, the second wafer is turned onto the first wafer and bonded, using a bonding process similar to any of a variety of $SiO_2$—$SiO_2$ bonding processes known in the art. Examples of applicable bonding processes are described in Cheng, Y. et. al., "Localized Silicon Fusion and Eutectic Bonding for MEMS Fabrication and Packaging," IEEE Journal of Microelectromechanical Systems, Vol. 9, No. 1 (March 2000), pp. 1–8, and Maszara, W. et. al., "Bonding of Silicon Wafers for Silicon on-Insulator," Journal of Applied Physics 64 (10) (Nov. 15, 1998), pp. 4943–4950, which are incorporated by reference herein. After this step, substrate 354 of the second wafer 356 lies on top of a two element bonded stack as shown in FIG. 3B.

At step 308, substrate 354 is removed using known methods, whereby an open two-element bonded stack comprising first wafer 352 and second wafer 356 remains on the first substrate 350. The process is repeated at steps 310–316, wherein a third wafer 360 lying on a third substrate 358 is turned on top of the two-element bonded stack to form a three-element bonded stack, with the substrate 358 lying on top. Substrate 358 is removed, whereby an open three-element bonded stack remains. The process continues for each wafer until all have been added onto the bonded stack preform. The first substrate 750 may then be removed from the bottom end, where in the bonded stack constitutes the desired preform. After the preform is formed and prior to drawing, an annealing or laser ablation process may be applied to smooth out any rough edges or discontinuities in the void cavities.

Whereas many alterations and modifications will no doubt become apparent to a person of ordinary skill in the art after having read the foregoing description, it is to be understood that the particular embodiments shown and described by way of illustration are in no way intended to be considered limiting. For example, a technique analogous to an etching process used by Collimated Holes, Inc. of Campbell, Calif. can be used to generate wafers having void patterns, as described on the World Wide Web at collimatedholes.com. In this method, a block of material is produced in which soluble glass fibers are surrounded by insoluble "claddings", forming a matrix. After the block has been fused, plates are sliced, polished, and placed in an acid bath. The "core" glass is etched away, leaving a structure of very precise voids in the residual matrix. Etched plate arrays contain voids throughout the entire matrix, all the way to the edges of the plate.

As another example, the methods of the present disclosure may be readily used to build photonic bandgap (PBG) fibers. Moreover, by selecting successive wafers from different preforms having different refractive index profiles and/or void patterns, specialty optical fibers having arbitrarily complex cross-sectional void patterns, material patterns, and/or refractive index profiles that vary with axial distance can be created. As an example, axially periodic structures may be formed at intervals of $(n+m/4)\lambda$ to form devices such as Bragg gratings or other interferometric devices. Therefore, reference to the details of the preferred embodiments are not intended to limit their scope, which is limited only by the scope of the claims set forth below.

What is claimed is:

1. A method of fabricating an optical fiber, comprising:
   forming a plurality of wafers corresponding to longitudinally adjacent portions of the optical fiber;
   axially bonding said wafers together into a preform; and
   drawing the preform to create the optical fiber.

2. The method of claim 1, said step of forming the plurality of wafers comprising:
   forming a first preform having a desired refractive index profile; and
   removing slices from said first preform to form the plurality of wafers.

3. The method of claim 1, said step of forming the plurality of wafers comprising a flame hydrolysis process.

4. The method of claim 1, said step of forming the plurality of wafers comprising a chemical vapor deposition process.

5. The method of claim 1, said step of forming the plurality of wafers comprising a semiconductor fabrication material formation process.

6. The method of claim 1, further comprising the step of forming a void pattern into each of said plurality of wafers.

7. The method of claim 6, wherein identical void patterns are formed into each of said plurality of wafers.

8. The method of claim 6, wherein said step of forming a void pattern uses a lithographic method.

9. The method of claim 8, wherein each of said wafers has a nominal thickness no greater than the product of a minimum linear void dimension and an aspect ratio of said lithographic method.

10. The method of claim 8, wherein each of said wafers has a nominal thickness between 0.5 mm–1 cm, inclusive.

11. The method of claim 8, wherein each of said wafers has a nominal thickness less than 0.5 mm.

12. The method of claim 1, said wafers being attached to distinct substrates after said forming step, said bonding step further comprising:
   bonding a first and second wafer together using an $SiO_2$—$SiO_2$ bonding process, thereby creating a two-element bonded stack, said bonded stack having a first substrate associated with said first wafer attached at one end having a second substrate associated with said second wafer attached at one end;
   removing said second substrate from said bonded stack; and
   repeating said bonding and removing steps for each of said plurality of wafers to form said preform.

13. An optical fiber drawn from a perform comprising a plurality of wafers bonded together into said perform and corresponding to longitudinally arranged portions of said optical fiber.

14. A microstructured optical fiber as in claim 13 wherein said wafers comprise identical void patterns formed therein.

15. A method of fabricating a microstructured optical fiber, comprising:
   forming a preliminary preform having a refractive index profile corresponding to a desired material refractive index profile of said microstructured optical fiber;
   removing slices from said preliminary preform to form a plurality of wafers;
   lithographically forming a substantially identical void pattern into each wafer;
   axially bonding said wafers together into a second preform; and
   drawing the second preform to create the microstructured optical fiber.

16. The method of claim 15, said void pattern being configured and dimensioned such that an average void dimension of said microstructured optical fiber is less than one-half the wavelength of light to be guided thereby, and such that said microstructured optical fiber guides the light by an index-guiding effect.

17. The method of claim 16, wherein each of said wafers has a nominal thickness no greater than the product of a minimum linear void dimension and an aspect ratio of a lithographic method used in said step pf lithographically forming.

18. The method of claim 17, wherein each of said wafers has a nominal thickness between 0.5 mm–1 cm, inclusive.

19. The method of claim 17, wherein each of said wafers has a nominal thickness less than 0.5 mm.

20. A microstructured optical fiber drawn from a secondary perform comprising axially bonded wafers removed from a preliminary perform having a refractive index profile corresponding to a desired refractive index profile of said microstructured optical fiber and having identical void patterns lithographically formed therein.

* * * * *